(12) United States Patent
Gonzalez et al.

(10) Patent No.: US 10,543,824 B2
(45) Date of Patent: Jan. 28, 2020

(54) BRAKING DEVICE FOR A HYDRAULIC MOTOR VEHICLE BRAKE SYSTEM

(71) Applicant: Continental Teves AG & Co. oHG, Frankfurt (DE)

(72) Inventors: Jose Gonzalez, Bad Oeynhausen (DE); Heinrich Kreh, Florstadt (DE); Adrian Messner, Darmstadt (DE); Manfred Rüffer, Sulzbach (DE); Paul Wiebe, Weiterstadt (DE); Falk Petzold, Frankfurt/M (DE); Michael Jürging, Kelkheim (DE); Ricardo Toquero, San Luis Potosi (MX); Lothar Schiel, Hofheim (DE); Stefan Drumm, Saulheim (DE)

(73) Assignee: Continental Teves AG & Co. oHG, Frankfurt Au Main (DE)

( * ) Notice: Subject to any disclaimer, the term of this patent is extended or adjusted under 35 U.S.C. 154(b) by 21 days.

(21) Appl. No.: 15/771,864

(22) PCT Filed: Nov. 18, 2016

(86) PCT No.: PCT/EP2016/078116
§ 371 (c)(1),
(2) Date: Apr. 27, 2018

(87) PCT Pub. No.: WO2017/089234
PCT Pub. Date: Jun. 1, 2017

(65) Prior Publication Data
US 2018/0312150 A1 Nov. 1, 2018

(30) Foreign Application Priority Data
Nov. 23, 2015 (DE) .......... 10 2015 223 048

(51) Int. Cl.
*B60T 13/58* (2006.01)
*B60T 8/32* (2006.01)
(Continued)

(52) U.S. Cl.
CPC .............. *B60T 13/58* (2013.01); *B60T 8/326* (2013.01); *B60T 11/165* (2013.01); *B60T 13/143* (2013.01); *B60T 13/686* (2013.01)

(58) Field of Classification Search
CPC .......... B60T 13/10; B60T 13/12; B60T 13/16; B60T 13/143; B60T 13/145;
(Continued)

(56) References Cited

U.S. PATENT DOCUMENTS

| 3,967,538 A | 7/1976 | Thomas |
| 4,111,496 A | 9/1978 | Leiber |

(Continued)

FOREIGN PATENT DOCUMENTS

| DE | 4012958 A1 | 10/1991 |
| DE | 19641821 A1 | 4/1998 |

(Continued)

OTHER PUBLICATIONS

Korean Office Action for Korean Application 10-2018-7014282, dated Dec. 20, 2018, with translation, 21 pages.

(Continued)

*Primary Examiner* — Thomas J Williams
(74) *Attorney, Agent, or Firm* — RatnerPrestia (57) ABSTRACT

A modular braking device for a hydraulic motor vehicle brake system, which is optimized for remote actuation, including a hydraulic booster stage with a booster housing, a main brake cylinder mounted thereon, a booster piston
(Continued)

which is displaceable therein and delimits a pressure chamber which is supplied directly with pressure medium by a motor pump unit.

15 Claims, 11 Drawing Sheets

(51) Int. Cl.
*B60T 13/14* (2006.01)
*B60T 11/16* (2006.01)
*B60T 13/68* (2006.01)

(58) Field of Classification Search
CPC .... B60T 13/161; B60T 13/162; B60T 13/165; B60T 13/58; B60T 11/165; B60T 8/326; B60T 8/3265
USPC .............................. 303/114.1; 188/355, 358
See application file for complete search history.

(56) References Cited

U.S. PATENT DOCUMENTS

| | | | | |
|---|---|---|---|---|
| 4,566,275 | A * | 1/1986 | Farr | B60T 13/145 60/554 |
| 4,655,512 | A * | 4/1987 | Leiber | B60T 8/341 188/DIG. 1 |
| 4,724,674 | A * | 2/1988 | Fulmer | B60T 13/145 60/548 |
| 5,253,477 | A * | 10/1993 | Williamson | B60T 13/168 60/547.1 |
| 6,478,385 | B1 * | 11/2002 | Nishii | B60T 8/3275 303/113.1 |
| 8,534,773 | B2 | 9/2013 | Honda et al. | |
| 9,096,206 | B2 | 8/2015 | Linkenbach et al. | |
| 2002/0096936 | A1 * | 7/2002 | Ishida | B60T 8/24 303/114.1 |
| 2004/0189086 | A1 * | 9/2004 | Kusano | B60T 8/441 303/114.1 |
| 2012/0074769 | A1 * | 3/2012 | Sakata | B60T 13/145 303/11 |
| 2013/0175851 | A1 * | 7/2013 | Honda | B60T 8/4275 303/6.01 |

FOREIGN PATENT DOCUMENTS

| | | |
|---|---|---|
| DE | 102004014701 A1 | 11/2004 |
| FR | 2343630 A1 | 10/1977 |
| FR | 2573019 A1 | 5/1986 |
| GB | 2125498 A | 3/1984 |
| GB | 2168120 A | 6/1986 |
| JP | S61115761 A | 6/1986 |
| JP | 2012224323 A | 11/2012 |
| KR | 20130102059 A | 9/2013 |
| WO | 2011026710 A1 | 3/2011 |

OTHER PUBLICATIONS

International Search Report and Written Opinion for International Application No. PCT/EP2016/078116, dated Feb. 24, 2017, 11 pages.
German Search Report for German Application No. 10 2015 223 048.1, dated Oct. 6, 2016, including partial English translation, 10 pages.
Chinese Office Action for Chinese Application No. 201690001383.7, dated Mar. 8, 2019 with partial translation, 3 pages.
European Communication Pursuant to Article 94(3) for European Application No. 16 798 479.8, dated Jun. 14, 2019, 7 pages.
Notification of Reason for Refusal for Korean Application No. 10-2018-7014282, dated Jun. 20, 2019, with translation, 19 pages.

* cited by examiner

BRAKING DEVICE FOR A HYDRAULIC MOTOR VEHICLE BRAKE SYSTEM

CROSS REFERENCE TO RELATED APPLICATIONS

This is the U.S. National Phase Application of PCT International Application No. PCT/EP2016/078116, filed Nov. 18, 2016, which claims priority to German Patent Application No. 10 2015 223 048.1, filed Nov. 23, 2015, the contents of such applications being incorporated by reference herein.

FIELD OF THE INVENTION

The invention relates to a brake device for a hydraulic motor vehicle brake system, having a hydraulic booster stage and having a master brake cylinder which is manually actuatable by means of a brake pedal.

BACKGROUND OF THE INVENTION

In brake apparatuses for hydraulic motor vehicle brake systems, conventional brake devices with negative-pressure brake force boosters, hydraulic tandem master brake cylinders and a downstream, electronically closed-loop-controlled modulator unit for closed-loop driving dynamics control functions are still regarded as being particularly lightweight, inexpensive, easy to produce and as exhibiting the most comfortable pedal feel and response characteristics. With ever-increasing demands on automated, computer-controlled driving and braking, and at the same time an ever-decreasing available structural space, negative-pressure brake force boosters, which are of large construction, reach their technical limits.

Use is therefore made of brake devices with more compact hydraulic booster stages. Known brake devices with hydraulic booster stages are however normally of highly complex construction, are reliant on heavy and expensive high-pressure accumulators as a pressure source, often require special, separate fastening interfaces that are incompatible with conventional systems, and furthermore have potential for improvement with regard to their response characteristic.

SUMMARY OF THE INVENTION

Therefore an aspect of the invention is an improved brake device with a hydraulically acting booster stage. It is the intention to realize this using the simplest means and at minimum cost, for this to exhibit comfort and interfaces as similar as possible to those of a conventional negative-pressure brake force booster.

The brake device according to an aspect of the invention has a hydraulic booster stage which, in an energy-efficient manner in accordance with a circulation principle, is fed directly by a motor-pump unit, such that no external high-pressure accumulator is necessary.

The system can be constructed in modular fashion, combined with different master brake cylinders, motor-pump units and downstream modulator units, and furthermore used on existing fastening interfaces in the vehicle, even as a replacement for negative-pressure brake force boosters. In this way, a wide variety of customer-specific characteristics can be replicated with variations of the brake device according to an aspect of the invention, and the integration thereof into existing systems can be simplified.

The brake device according to an aspect of the invention is fully monitorable by means of sensor devices for detecting movements of the piston rod and pressure in the pressure chamber, and is suitable for software-based, closed-loop-controlled externally-applied actuation and autonomous driving.

In the case of the brake device according to an aspect of the invention, a fully automated, driver-independent braking operation can be initiated very easily by closing an electrically controllable shut-off valve in a return line to the pressure medium reservoir.

In interaction with a downstream modulator unit, such as for example an ESP module, the modulator unit can be pre-charged with a defined hydraulic pressure by the brake device, whereby the hydraulic pump of the modulator unit is relieved of load, and a brake travel can nevertheless be shortened.

The use of an elastic reaction disk between the piston rod and the pressure piston ensures haptically comfortable feedback at the brake pedal and, in particular with the use of a transmission piece between the piston rod and the reaction disk, permits a response characteristic that can be set within a broad range in customer-specific fashion.

The compact, substantially coaxial construction in interaction with an external motor-pump unit and the elimination of a high-pressure accumulator leads to a considerable reduction of components, structural space, weight, production and assembly effort, and costs.

BRIEF DESCRIPTION OF THE DRAWINGS

Further features and advantages of aspects, of the invention will emerge from the following description of multiple exemplary embodiments according to aspects of the invention, and from the drawings. Components and features of different embodiments but with the same functions are denoted here preferentially by the same reference designations. In the drawings.

DETAILED DESCRIPTION OF THE PREFERRED EMBODIMENTS

Figure 1:
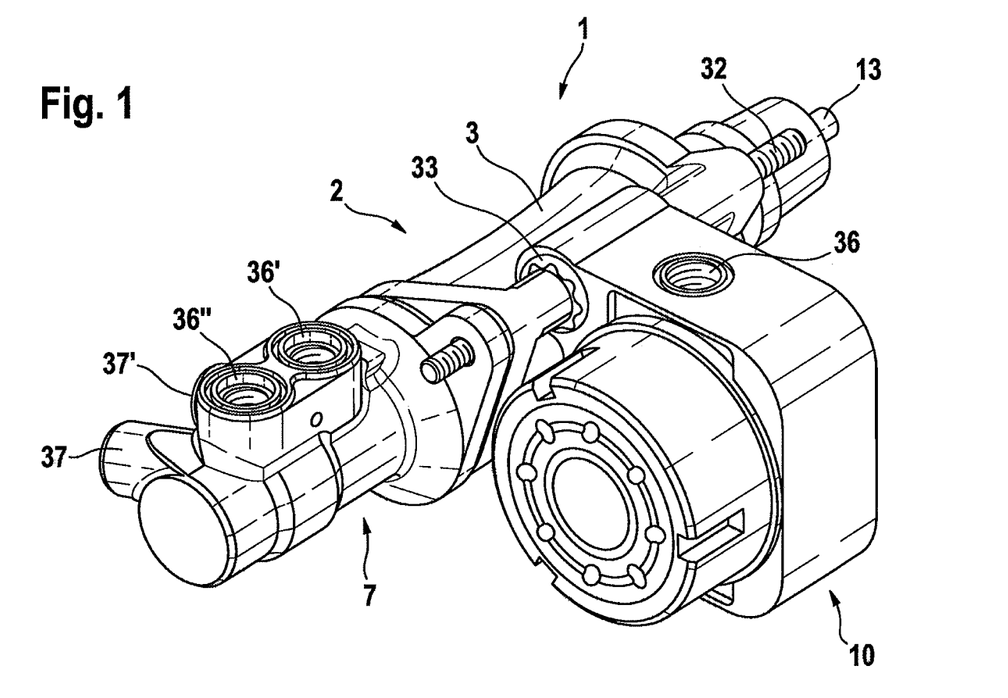
FIG. 1 shows an embodiment according to an aspect of the invention of the brake device in a three-dimensional view.
Figure 2:
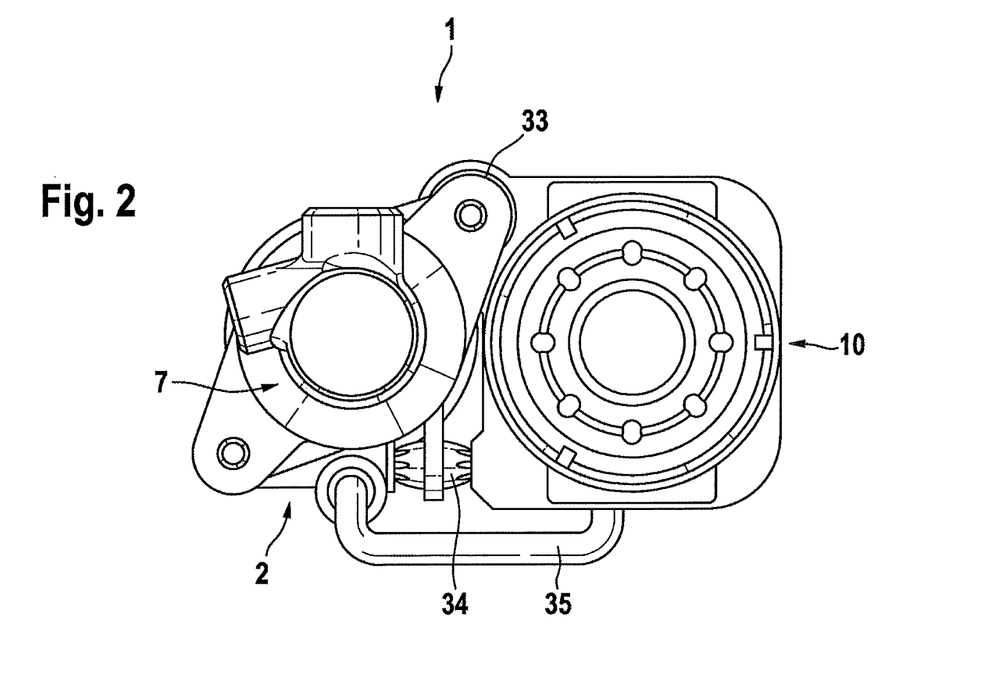
FIG. 2 shows the same embodiment in a frontal view.

FIGS. 1 and 2:

A first embodiment of the brake device 1 according to an aspect of the invention is illustrated in FIGS. 1 and 2 in external views. The brake device 1 is of modular construction and comprises substantially a hydraulic booster stage 2 with a booster housing 3, a master brake cylinder 7, and an electrically driven motor-pump unit 10.

The booster stage 2 is actuated, via an axially displaceable piston rod 13, by a brake pedal 15 (not shown here), possibly with the interposition of further conventional mechanical components (not shown here).

The electric-motor-driven motor-pump unit 10 is mounted pivotably at the fastening bolt 32 in an elastic radial damper 33, and is supported and fixed against a fastening point on the booster housing 3 with the interposition of an axial damper 34. In this way, torques of the motor-pump unit 10 are, in terms of vibrations, optimally accommodated and isolated.

In the embodiment shown, the fastening bolt 32 has, on both ends, a thread for the mounting of a threaded nut, and serves at the same time for the mounting of the master brake cylinder 7 on the booster housing 3 and for the fastening of the entire brake device 1 to a vehicle part (not shown) which is fixed with respect to a bodyshell, such as for example a bulkhead in the engine bay.

Here, the interface is preferably designed to be unified with further types of brake devices—for example with a pneumatic brake force booster, whereby the use of different brake device types on the same vehicle type can be realized.

By means of the reservoir ports 36, 36', 36", the master brake cylinder 7 and the motor-pump unit 10 are fed from preferably a single, common pressure medium reservoir 11 (not illustrated in the figure). The use of multiple separate pressure medium reservoirs is however admissible at all times within an aspect of the invention.

Via a hydraulic connection 35, the pressure medium is, when required in a braking situation, supplied by the motor-pump unit 10 directly, without an interposed high-pressure accumulator, to the booster stage 2, where said pressure medium can be used immediately, "on demand", for building up a boosting force that acts on the master brake cylinder 7. The booster stage according to an aspect of the invention thus functions in accordance with a circulation principle, or as a circulation booster.

FIGS. 3-6

FIGS. 3 to 6 illustrate the internal construction and functioning of an embodiment of the brake device according to an aspect of the invention on the basis of a highly simplified axial sectional illustration. In the booster housing 3 of the booster stage 2, a booster piston 4 is guided in axially displaceable fashion with a sealing action radially to the outside, and here, said booster piston is supported against a restoring spring 39 which serves for the restoring movement of the booster piston 4 after a braking process.

In the booster housing 3, the booster piston 4 separates a pressure chamber 5 from a return chamber 6, which are filled with a hydraulic pressure medium—for example brake fluid.

The return chamber 6 is connected via a return connection 12 to a pressure medium reservoir 11, which is unpressurized or is at atmospheric pressure.

A piston rod 13 which is actuatable by means of a brake pedal 15 is guided in a central bore in the booster piston 4 so as to be axially displaceable relative to the booster piston 4 and relative to the booster housing 3. By means of the piston rod 13, the un-boosted actuation force from the brake pedal 15 can be introduced via a pressure-stable transmission piece 31 into an elastic reaction disk 19, and from there, with hysteresis, into the pressure piston 8 of the master brake cylinder 7. At the same time, the reaction disk 19 introduces a reaction force into the piston rod 13, which reaction force is registered by the driver substantially as haptic feedback or as a characteristic pedal feel at the brake pedal 15.

Through variation of the diameter of the transmission piece 31 and of that face side thereof which is in contact with the reaction disk 19, the corresponding effective area and thus reaction force can be influenced in a force-dependent and travel-dependent manner. The response behavior of the brake device, and the pedal feel, can thus be very easily adapted in accordance with demand.

A hydraulic passage 14 is formed, as a combination of axial and transverse bores, in the piston rod 13. In a manner dependent on an axial relative position between the piston rod 13 and the booster piston 4, a hydraulic connection between the return chamber 6 and the pressure chamber 5 is made possible by means of the hydraulic passage 14.

An abutment element 41 serves for the defined positioning of the piston rod 13 in the booster housing 3 in the non-actuated initial position or release position. The abutment element 41 may preferably be formed as a circlip which is inserted into a corresponding encircling groove on the piston rod 13. However, further embodiments with equivalent functionality are likewise admissible within an aspect of the invention.

In the embodiment shown, the piston rod 13 is mounted so as to be preloaded by a spring element 40 axially against the booster piston 4, whereby not only are the response behavior and pedal feel influenced, but also particularly exact actuation of the brake device 1 is made possible. A correlation between the two components without a spring is however likewise admissible within an aspect of the invention.

Within an aspect of the invention, in other embodiments, the spring element 40 may also be positioned at other locations, and arranged for example between the booster housing 3 and the piston rod 13 or between the piston rod 13 and a separate control sleeve 25 in the booster piston 4, as can be seen in particular from FIGS. 7 to 12.

By means of a sensor device 16, the position and preferably also the change in position of the piston rod 13 are detected and transmitted to an electronic control unit 17, which processes these and outputs electrical signals for the actuation of the motor-pump unit 10. Within an aspect of the invention, it is admissible for the piston rod 13 to be monitored by means of the sensor device 16 both directly and indirectly—for example on the basis of the monitoring of the brake pedal 15 coupled to the piston rod 13.

After being activated, the motor-pump unit 10 delivers the pressure medium out of the pressure medium reservoir 11 into the pressure chamber 5, and effects a pressure build-up therein. The booster piston 4 is thereupon displaced in the direction of the master brake cylinder 7, and transmits the boost force resulting from the pressure build-up to the pressure piston 8 of the master brake cylinder 7, in order to generate a brake pressure in the pressure chamber 9. In the embodiment shown, this is realized not directly but rather via a separate thrust piece 38, which can serve in particular as an adapter for easier adaptation of different dimensions on the pressure piston 8 and booster piston 4. In other embodiments within an aspect of the invention, a thrust piece of said type may also be omitted.

In the embodiment shown, use is made of a conventional master brake cylinder 7 of tandem type of construction with two pressure chambers respectively connected to brake circuits and with two displaceable pistons, though it is self-evidently also possible within an aspect of the invention for other master brake cylinder types to be used.

Figure 3:
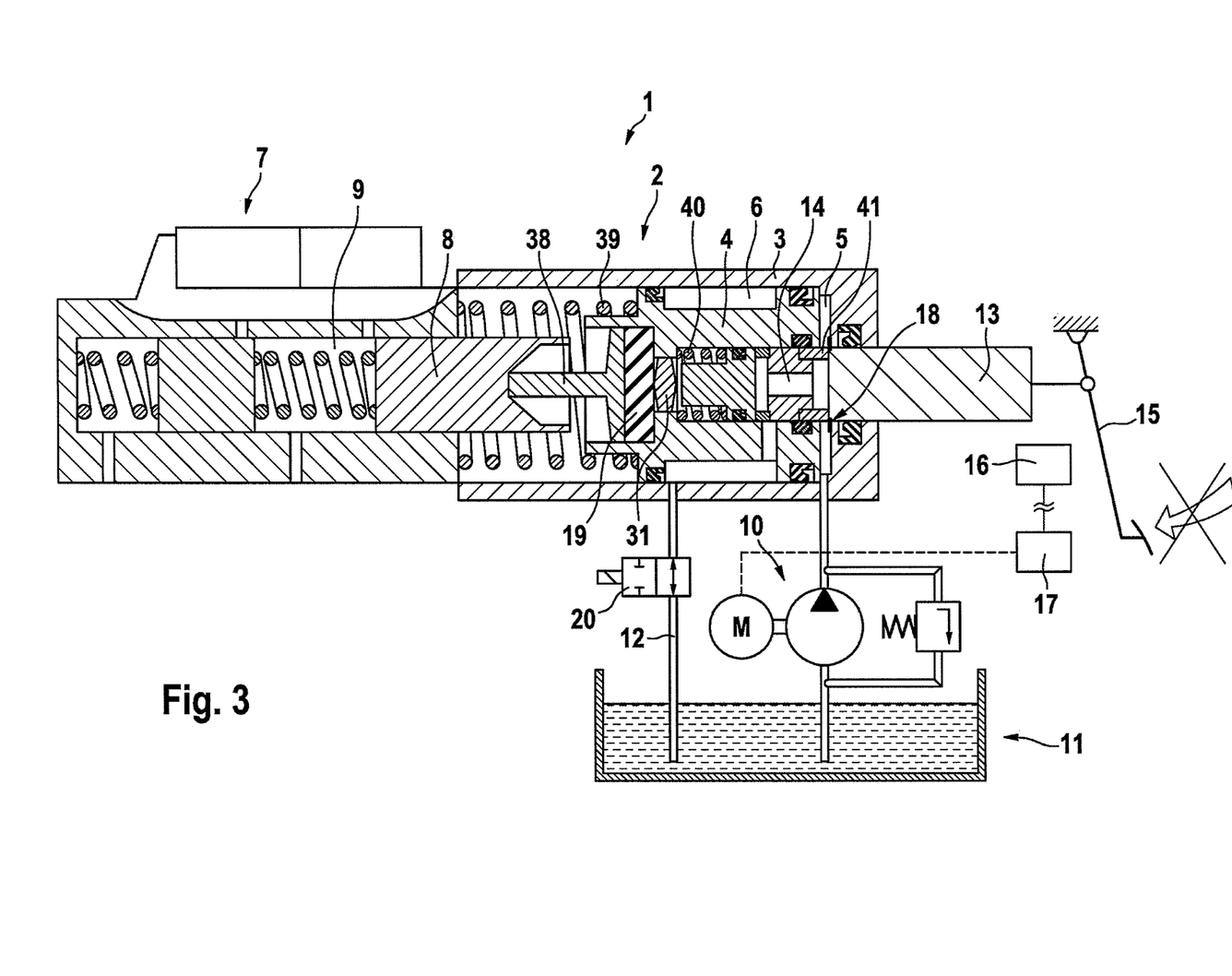
FIG. 3 shows a highly simplified longitudinal sectional illustration of an embodiment according to an aspect of the invention in a released position or non-actuated initial position.

FIG. 3 shows the brake device 1 in a released position or in the non-actuated initial position. Here, the brake pedal is not actuated, the motor-pump unit 10 is deactivated, the shut-off valve 20 keeps the return connection 12 open, and the piston rod 13 and the booster piston 4 are situated in their respective non-actuated initial positions, such that a hydraulic connection exists between the pressure chamber 5 and the return chamber 6 through the hydraulic passage 14.

Figure 4:
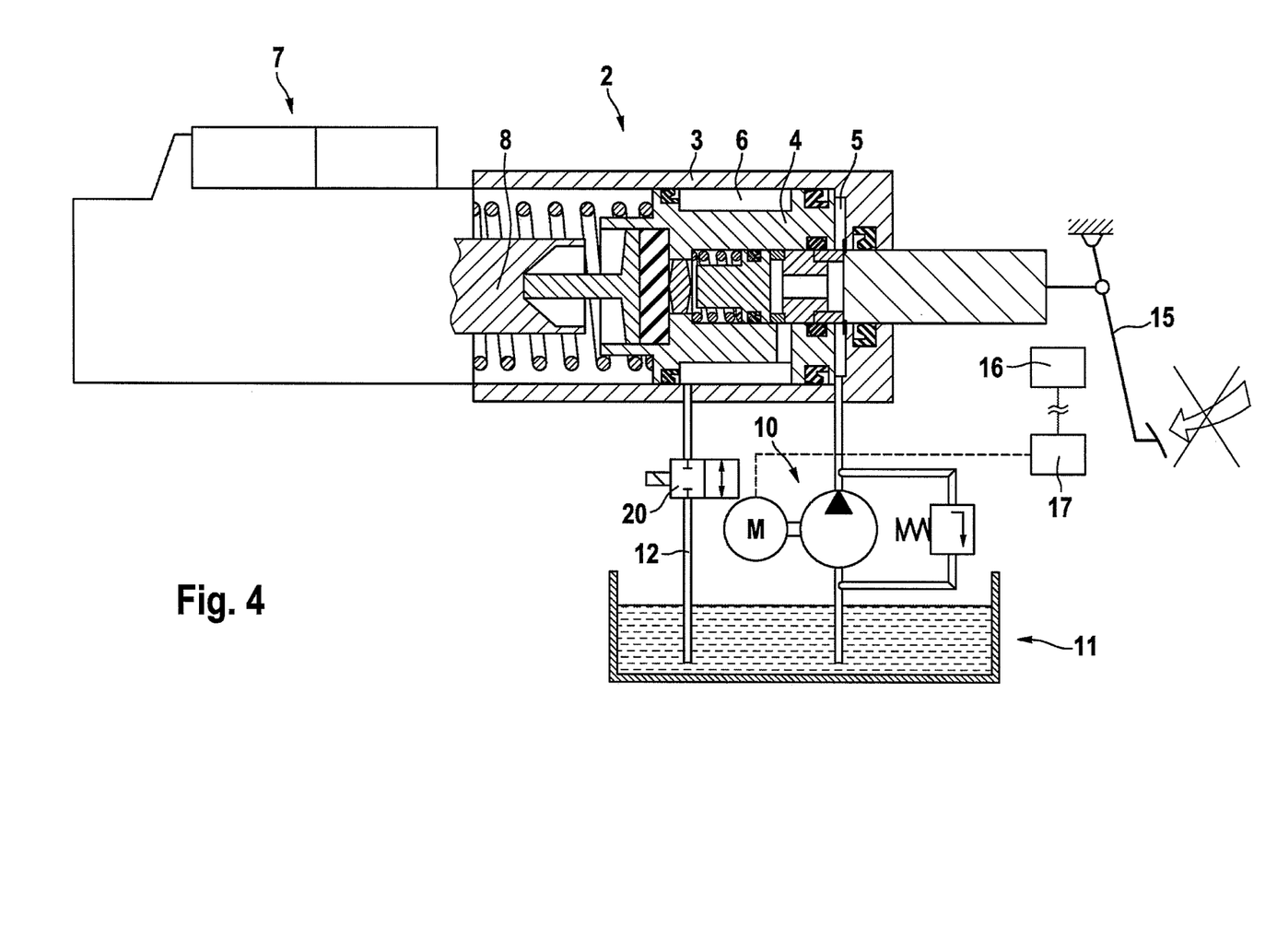
FIG. 4 shows a brake device as per FIG. 3 during a driver-independent, externally-applied actuation.

FIG. 4 illustrates a state at the start of an externally applied, driver-independent braking operation. Here, the brake pedal 15 remains non-actuated, the shut-off valve 20 is closed, and the return connection 12 is thus shut off, and the motor-pump unit 10 runs in a manner actuated by the electronic control unit 17 and delivers the pressure medium into the pressure chamber 5. The pressure medium cannot flow out via the return connection 12 into the pressure medium reservoir 11, whereby pressure builds up in the pressure chamber 5, which pressure will lead to the displacement of the booster piston 4 in the direction of the master brake cylinder 7.

Figure 5:
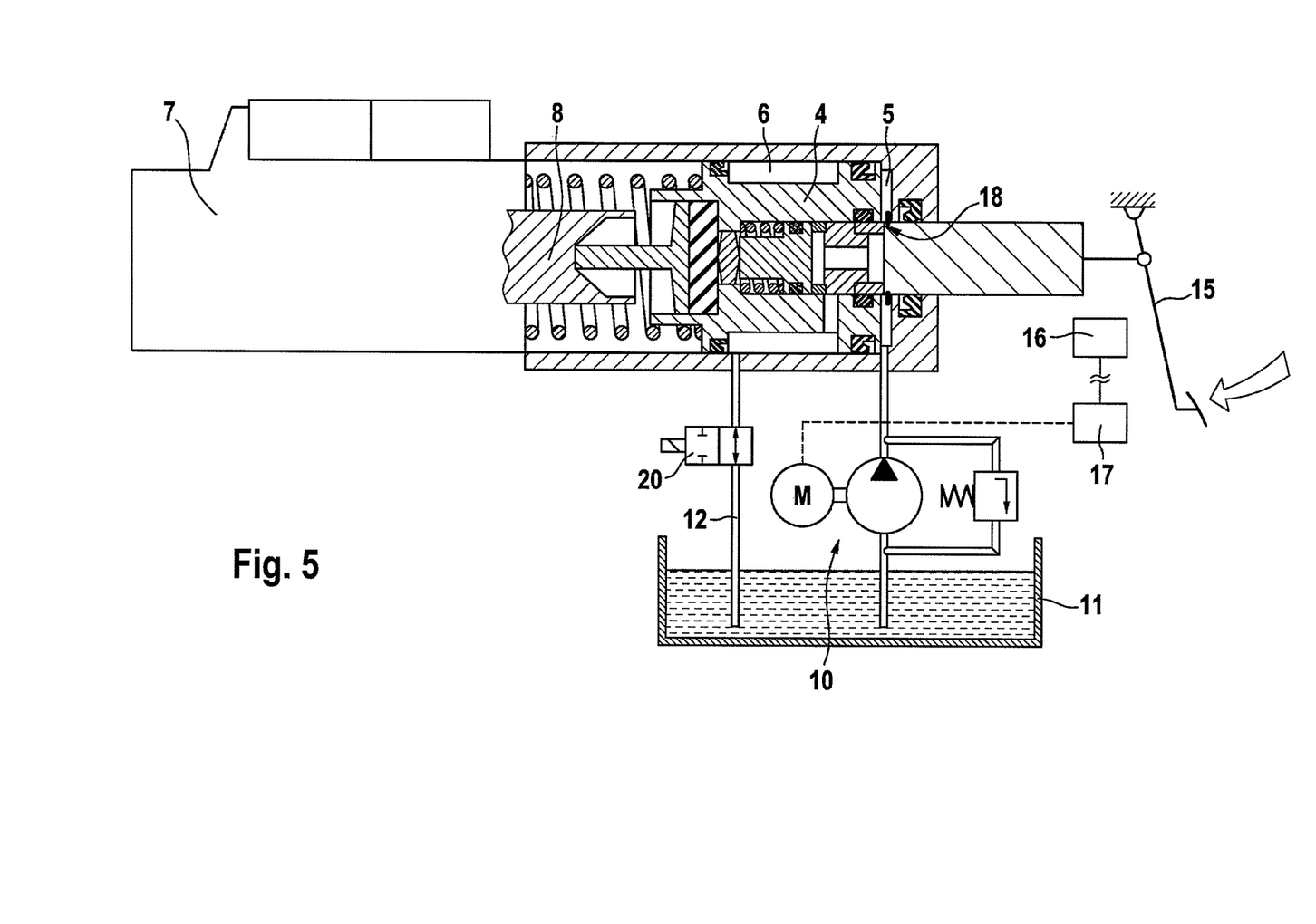
FIG. 5 shows a brake device as per FIG. 3 during a normal, moderate actuation by the driver by means of a brake pedal, or manual actuation.

By contrast to FIG. 4, FIG. 5 shows a normal, moderately intensive driver-initiated braking operation.

The hydraulic passage 14 has a first control edge 18. This is formed by a pressure-chamber-side outer edge of a pressure-chamber-side transverse bore in the piston rod 13, which is a constituent part of the hydraulic passage 14. For a more detailed illustration, reference is made here to FIGS. 7 to 12.

The shut-off valve 20 is open, and the booster piston 4 is situated in its non-actuated initial position.

The driver actuates the brake pedal 15 and displaces the piston rod 13 relative to the booster piston 4 in the direction of the master brake cylinder 7. The displacement of the piston rod 13 is detected by means of the sensor device 16, whereupon the motor-pump unit 10 is activated and begins to deliver the pressure medium into the pressure chamber 5. It is initially possible for a small volume quantity of the pressure medium to escape from the pressure chamber 5 through the hydraulic passage 14 into the return chamber 6, and from there through the return connection 12 back into the pressure medium reservoir 11. In this way, an abrupt, sudden pressure build-up in the pressure chamber 5 is avoided.

After a short displacement travel, the control edge 18 closes the hydraulic passage 14 and thereby separates the pressure chamber 5 from the return chamber 6 and from the pressure medium reservoir 10, such that the pressure medium can no longer flow out of the pressure chamber 5, an intensive pressure build-up occurs therein, and the booster piston 4 is displaced, exerting the boost force on the pressure piston 8.

The reaction disk 19 is compressed as a result of the displacement of the piston rod 13, and generates, on the piston rod 13, a reaction force directed oppositely to the displacement direction and thus, for the driver, a comfortable, "analogue" pedal feel at the brake pedal 15, despite a boost force generated indirectly by means of an electronically actuated motor-pump unit 10.

Figure 6:
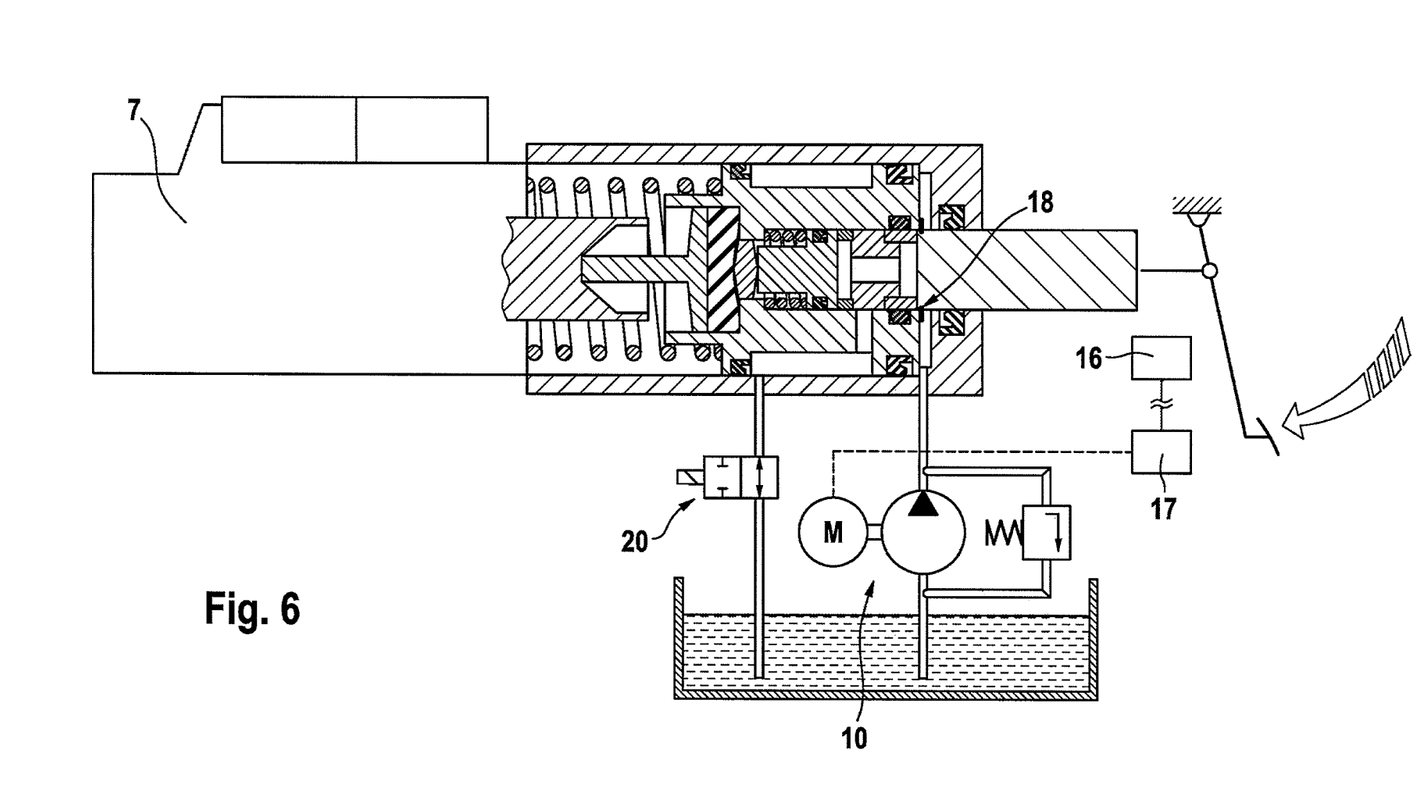
FIG. 6 shows a brake device as per FIG. 3 during an intensive actuation by the driver, such as for example an emergency braking operation.

FIG. 6 shows a state at the start of a likewise driver-initiated braking operation, but one which is much faster and more intense in relation to FIG. 5—for example an emergency braking operation. As a result of a fast displacement of the piston rod, the control edge 18 is closed almost immediately, such that an intense pressure build-up occurs immediately in the pressure chamber 5, and the brake travel is reduced as a result of shortening of the system reaction time. The associated comfort losses may in this case be accepted in favor of safety.

Figure 7:
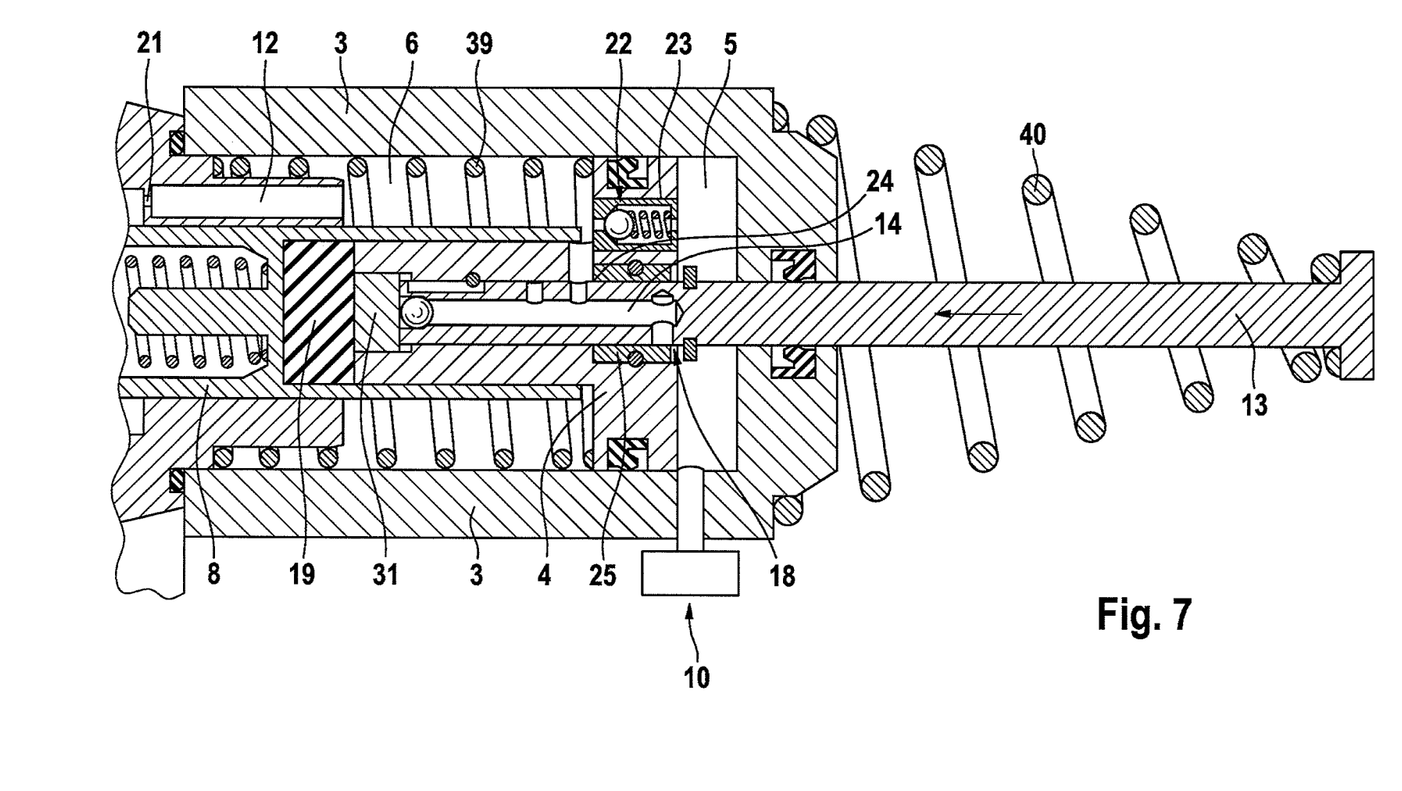
FIG. 7 shows a partial region of another embodiment according to an aspect of the invention of the brake device in longitudinal section during manual actuation, in a pressure build-up phase.

FIG. 7 shows a sectional view of a region of another embodiment according to an aspect of the invention of the brake device 1 in a pressure build-up phase at the start of a braking operation.

Here, the return connection 12 is formed as a separate duct through the master brake cylinder 7, which duct connects the return chamber 6 of the booster stage 2 to a reservoir port 36' of the master brake cylinder 7, and thus to a pressure medium reservoir 11 connected thereto.

In particular in the case of extremely dynamic braking processes, particularly high demands are placed on the brake device 1 with regard to adequately fast volume provision of the pressure medium in the pressure chamber 5, a consequence of which may be the use of a more powerful and thus undesirably larger and heavier motor-pump unit 10.

To avoid this, a throttle point 21 is provided in the return connection 12, and an overflow device 22 is provided between the return chamber 6 and the pressure chamber 5.

The throttle point 21 may for example be formed, as illustrated, as a constriction in a hydraulic duct, and is designed such that small defined volume flows through the return connection 12, such as arise during moderate braking operations, can pass through said throttle point in a relatively unhindered manner. During intensive braking operations with particularly fast displacements of the booster piston 4, the throttle point 21 however gives rise to a back pressure in the return chamber 6. If the pressure difference between the return chamber 6 and the pressure chamber 5 falls below a defined value, the overflow device 22 opens a hydraulic connection, such that a volume transfer of the pressure medium from the return chamber 6 to the pressure chamber 5 through the overflow device 22, and thus forced filling of the pressure chamber 5, briefly take place, before the motor-pump unit 10 ensures the required volume provision.

In the embodiment shown, the overflow device 22 is designed as a spring-loaded pressure relief valve which is arranged in an axial recess 23 in the booster piston 4. Other positions (not shown here) for the pressure relief valve, for example in a separate duct in the booster housing 3, are likewise admissible within an aspect of the invention.

Figure 8:
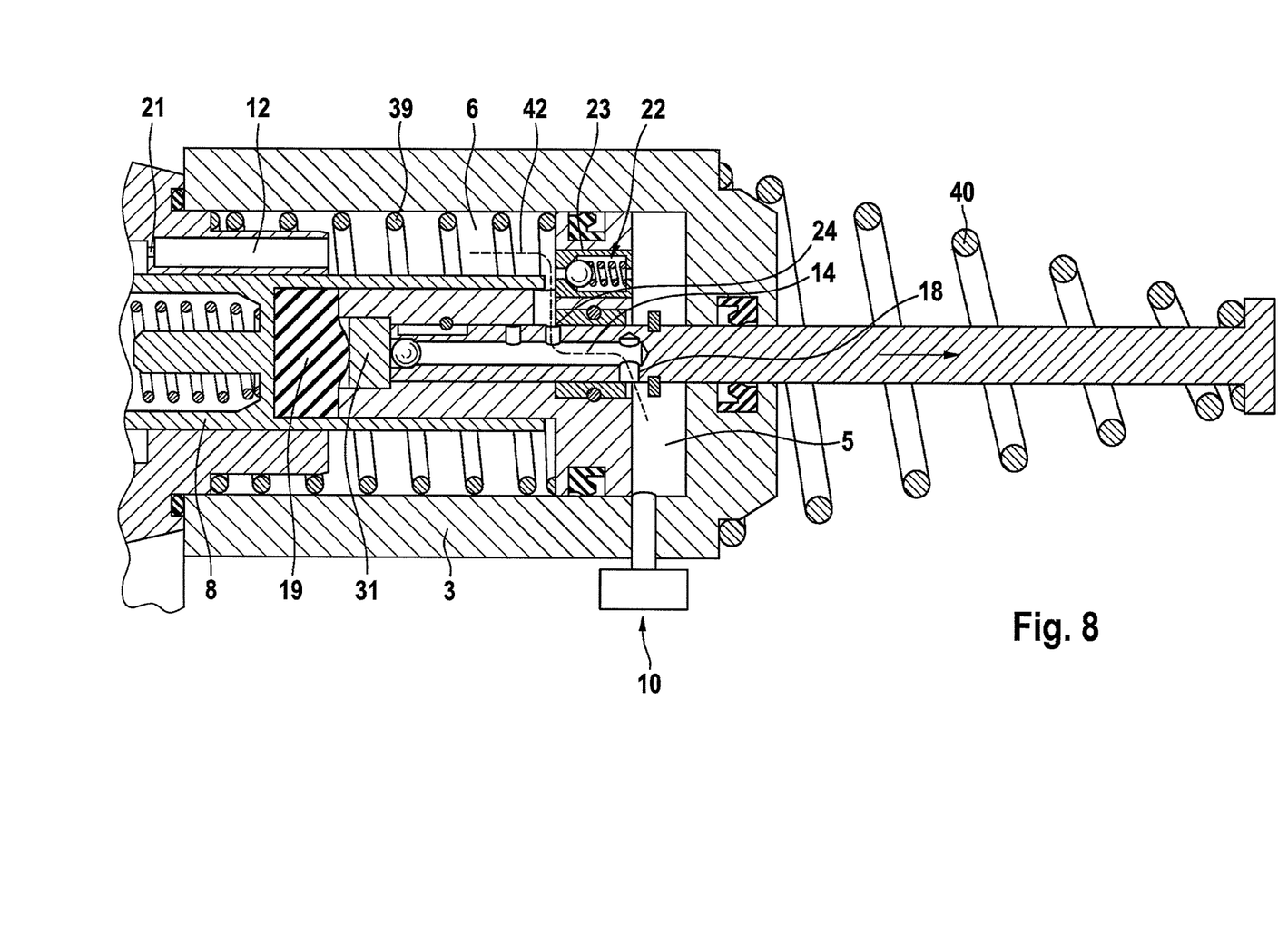
FIG. 8 shows the embodiment as per FIG. 7 in a return or pressure depletion phase.

FIG. 8 shows the embodiment as per FIG. 7 in a pressure-holding phase during a braking operation. It is pointed out here that the pressure depletion phase after a braking process would involve basically similar positioning of the components relative to one another.

In the pressure-holding phase, the actuation force on the piston rod 13 and the reaction force on the reaction disk 19 are in equilibrium. This gives rise to a relative displacement of the piston rod 13 with respect to the booster piston 4 to such an extent that the first control edge 18 is opened and pressure medium can escape, as volume flow 42, through the hydraulic passage 14 from the pressure chamber 5 into the return chamber 6 and from there through the return connection 12 into the pressure medium reservoir 11. The escaping quantity of the pressure medium is compensated continuously by the motor-pump unit 10, such that the booster piston 4 is in axial force equilibrium and remains at rest in an axial position.

During the depletion of pressure, the motor-pump unit 10 stops, and the pressure medium escapes from the pressure chamber 5 into the return chamber 6 along the same path owing to the backward displacement of the booster piston 4 together with the piston rod 13 and the pressure piston 8.

Figure 9:
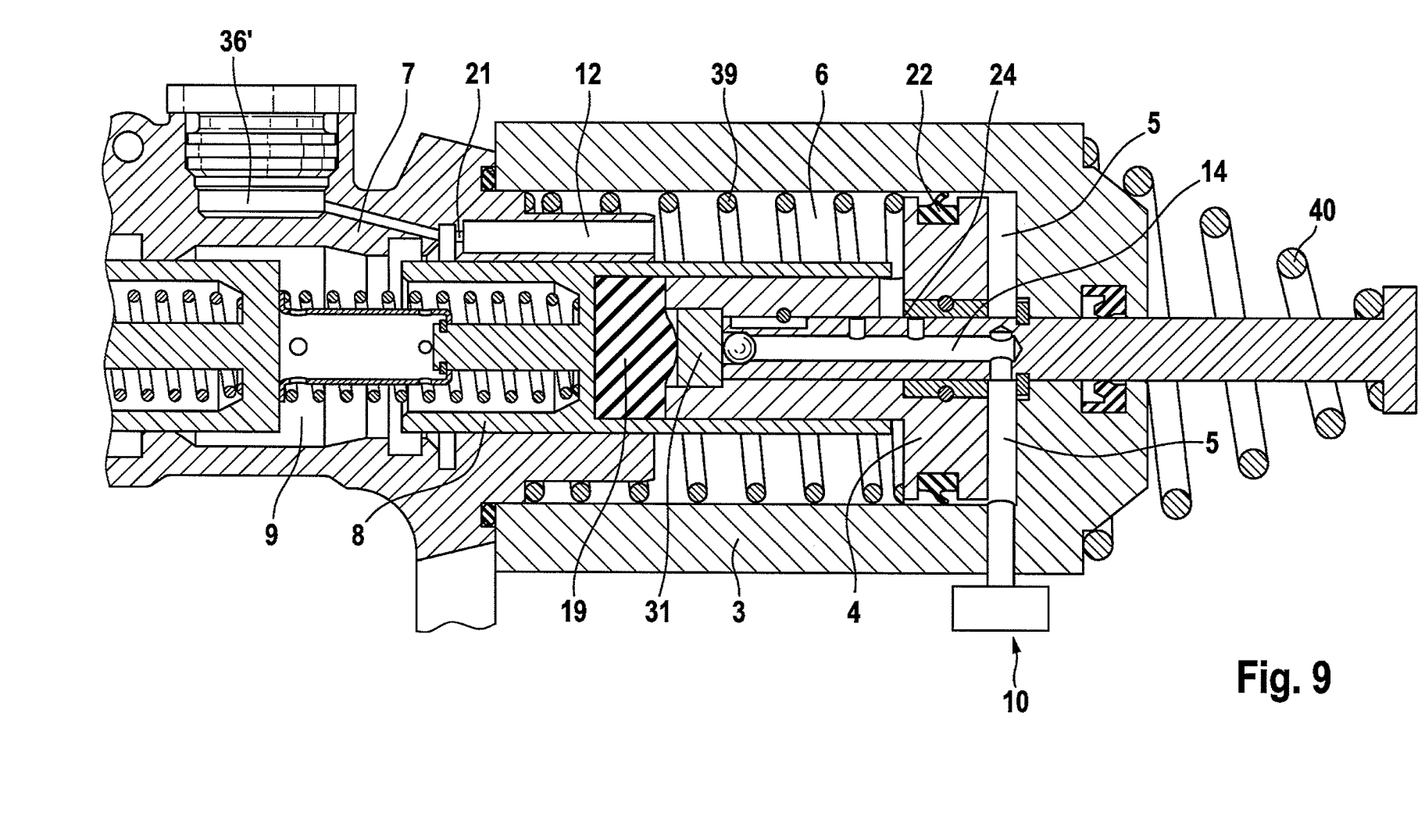
FIG. 9 shows a further embodiment according to an aspect of the invention of the brake device in a non-braked initial position or released position.

In a further embodiment in FIG. 9, the function of the overflow device 22 is integrated in a particularly efficient and component-saving manner into a radial sealing element between the booster piston 4 and the booster housing 3. Such sealing elements commonly have at least one radial sealing lip which slides on a cylindrical surface—in the present case of an inner wall in the booster housing 3—and blocks a volume transfer. The sealing element on the brake device 1 according to an aspect of the invention that is shown is designed such that, in the presence of a defined back pressure or pressure difference between the return chamber 6 and the pressure chamber 5, a volume transfer takes place from the return chamber 6 to the pressure chamber 5. This may be realized for example by virtue of a flow passing around the sealing lip in the direction of the pressure chamber 5 or by virtue of a sealing lip designed for this purpose being folded over in a pressure-dependent manner.

Figure 10:
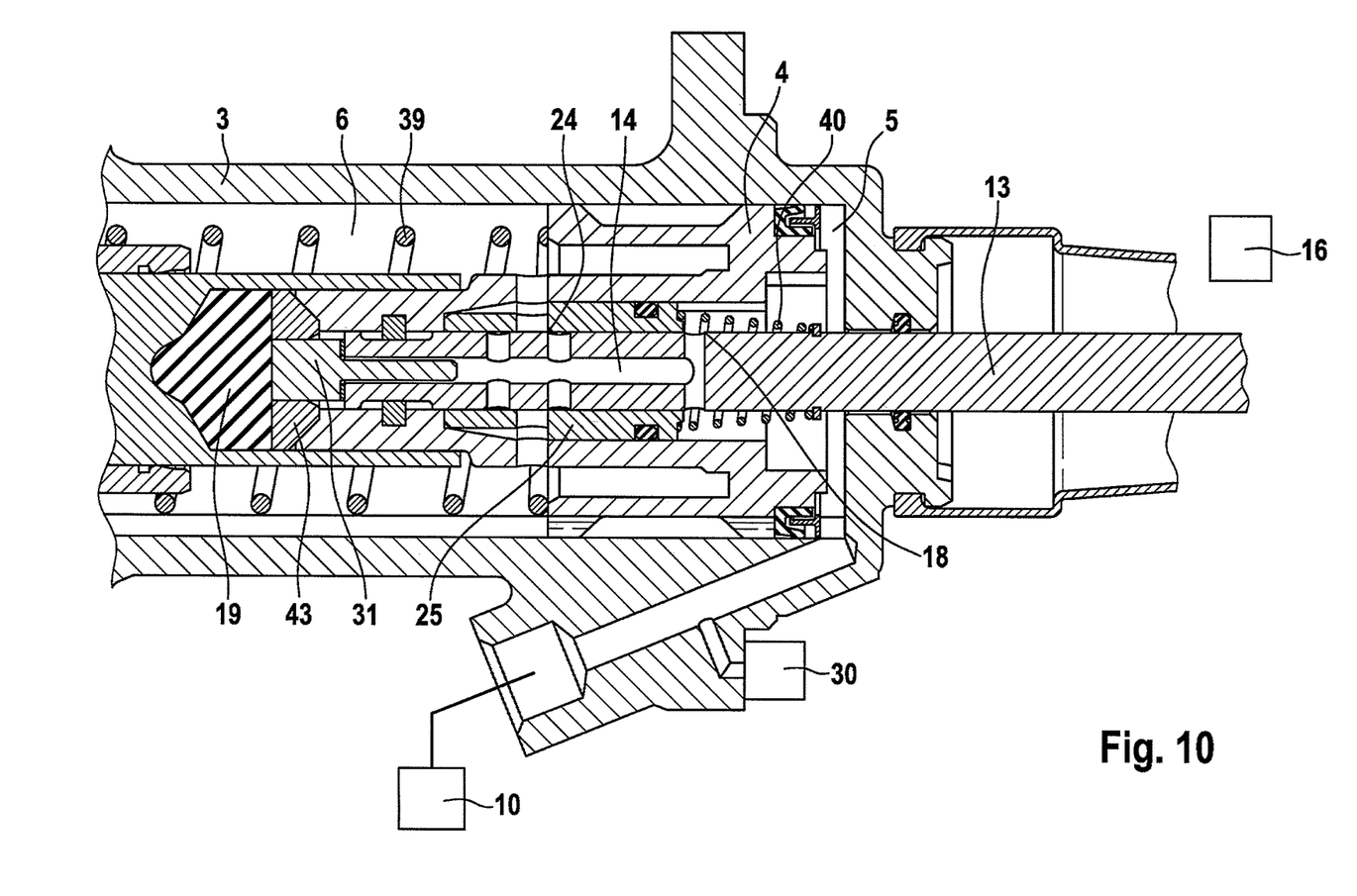
FIG. 10 shows a partial region of a further embodiment according to an aspect of the invention of the brake device with a control sleeve, in longitudinal section.

FIG. 10 shows a further embodiment of the brake device 1, which is suitable in particular for externally-applied actuation. As already described in FIG. 4, in the case of externally-applied actuation, the motor-pump unit 10 alone is activated by means of an electronic control unit 17, without the piston rod 13 being actuated by the driver. For this purpose, on the hydraulic passage 14, there is provided a second control edge 24 which, in the non-actuated piston rod 13, forcibly shuts off the hydraulic passage 14, thereby prevents the outflow of the volume flow from the pressure chamber 5 into the return chamber 6, and thus ensures a pressure increase in the pressure chamber 5 when the motor-pump unit 10 is activated.

A second control edge 24 is formed by an outer edge, at the master brake cylinder side, of a further transverse bore in the piston rod 13, which further transverse bore is likewise a constituent part of the hydraulic passage 14 and is arranged so as to be axially offset, in the direction of the master brake cylinder 7, in relation to the first control edge 18 or the transverse bore assigned thereto.

In a preferred embodiment, for particularly easy customer-specific adaptation of the response behavior, and for an exact switching capability of the booster stage 2, a separate control sleeve 25 is provided. The control sleeve 25 engages radially around the piston rod 13, such that the first and the second control edges 18, 24 act in each case between the piston rod 13 and the control sleeve 25. In association with this, the switching points can be adapted in a particularly exact, customer-specific manner, with minimized production effort, to different brake devices. In this way, it is for example possible to use a defined pairing of piston rod 13 with control sleeve 25 in combination with different booster pistons 4, and to thus inexpensively obtain a defined response and switching behavior in the case of different customer-specific applications of the brake device 1.

The control sleeve 25 is preferably manufactured from a wear-resistant and dimensionally stable material such as metal. In this way, it is made possible for the much larger booster piston 4 to be produced, in a weight-optimized, cost-optimized and production-optimized manner, from a lightweight and easily moldable material such as for example plastic. By means of a smaller moving mass of the booster piston 4, the dynamics of the brake device 1 are also improved.

By virtue of a sensor device 16 that has already been described in FIG. 3 being supplemented by a pressure sensor 30 which monitors the pressure in the pressure chamber 5 and which likewise transmits its signals to an electronic control unit 17, the brake device 1 according to an aspect of the invention is made suitable for autonomous driving.

Furthermore, the illustrated embodiment of the brake device 1 has a guide disk 43 which bears against the reaction disk 19 at the booster piston side. In the embodiment shown, the guide disk 43 has an axial passage bore, in which the transmission piece 31 is guided, and has a conical contour at the booster piston side, which contour leads to positive radial centering of the booster piston 4 under the action of force. In this way, in particular, exact reproducibility of the brake pressure, as an output signal, in response to the boost force originating from the booster piston 4, as an input signal, is assisted, which is an aim that is particularly worth pursuing in the context of automated, autonomous driving.

In particular in the case of dynamic braking processes, it is necessary to fix the relative axial position of the control sleeve 25. For this purpose, the embodiment as per FIG. 11 has a locking means 26 which acts between the booster piston 4 and the piston rod 13 through the control sleeve 25.

Figure 11:
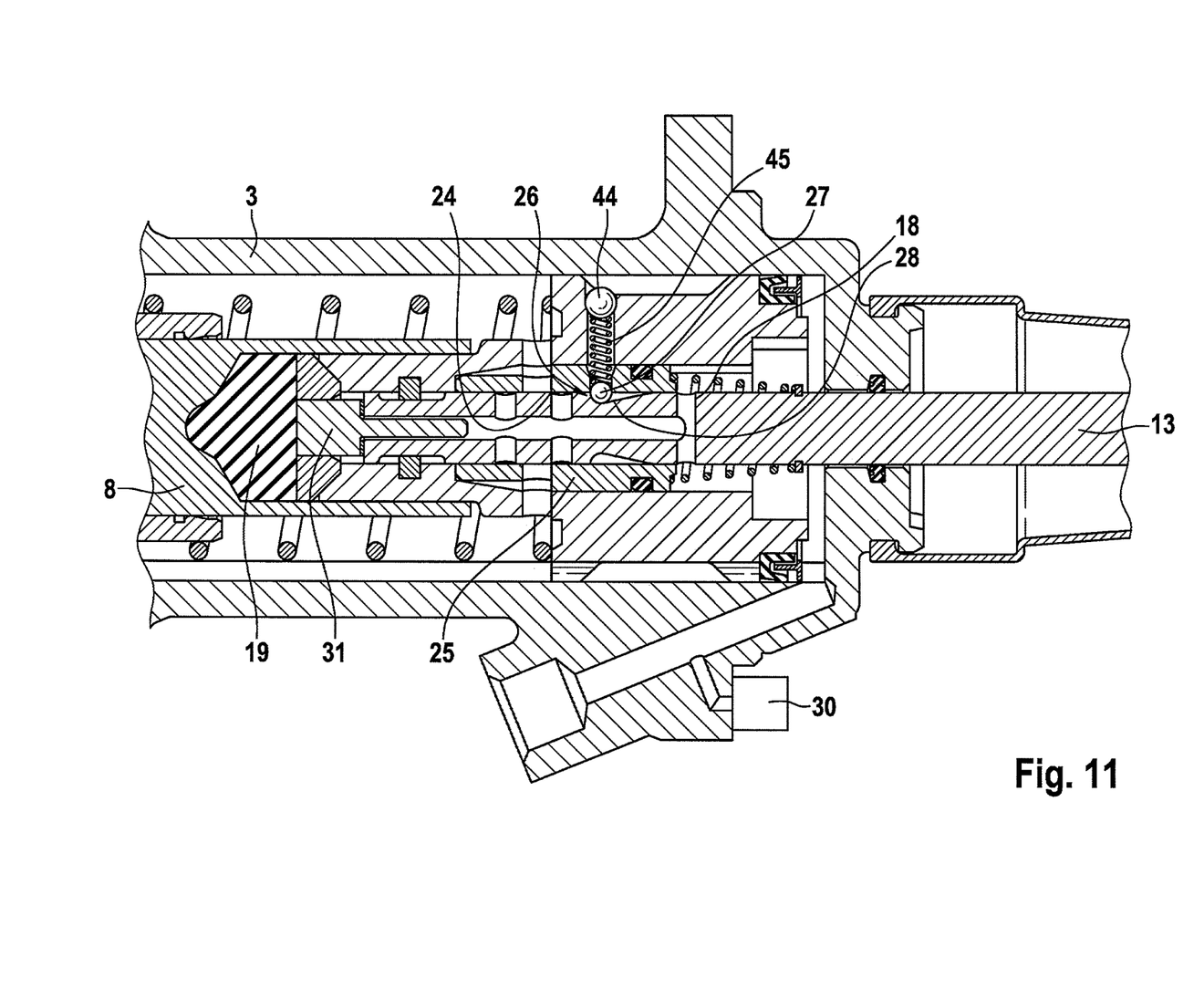
FIG. 11 shows a partial region of a further embodiment according to an aspect of the invention of the brake device with control sleeve and with locking by means of a spring-loaded ball, in longitudinal section.

The locking means 26 is formed with a ball 27 which engages, under the load of a compression spring 45, into a radial recess 28 on the piston rod 13. The compression spring 45 is supported radially at the outside against a plug element 44 which is inserted fixedly into the booster piston 4.

The driver can mechanically engage the locking means 22 at all times, and thus intervene in the braking process, by actuating the piston rod 13.

Figure 12:
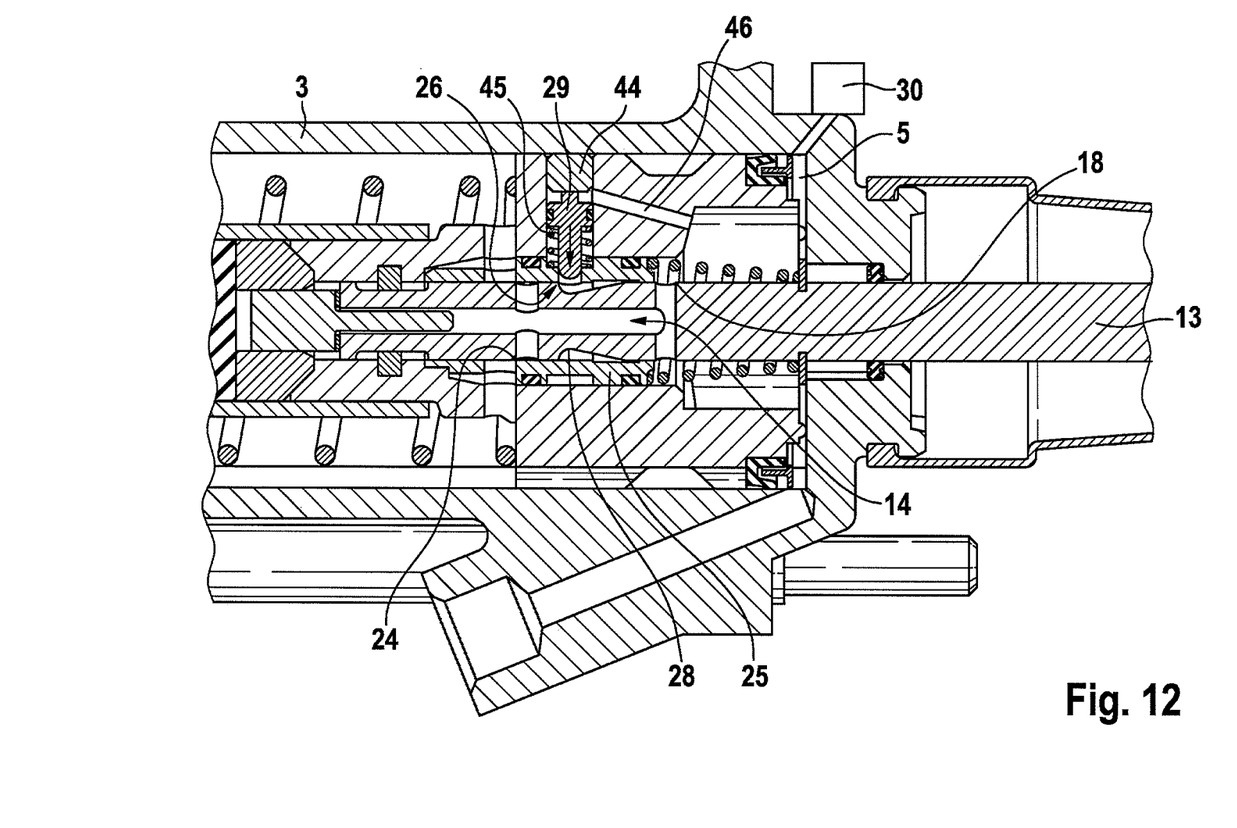
FIG. 12 shows a partial region of a further embodiment according to an aspect of the invention of the brake device with control sleeve and with locking by means of a pressure-controlled arresting piston, in longitudinal section.

FIG. 12 shows a further embodiment of the locking means 26 which, in relation to the embodiment described above, is configured for higher moving masses and more dynamic braking operations.

An arresting piston 29 which is movable transversely with respect to the piston rod 13 is inserted into a transverse bore in the booster piston 4 and, by contrast to the situation in the variant as per FIG. 11, is pressed, in its unlocked position, against the plug element 44 by the compression spring 45. If the hydraulic pressure in the pressure chamber 5 increases, this is transmitted through the pressure duct 46 to the radially outer effective surface of the arresting piston 29 and displaces the arresting piston 29, counter to the pressing force of the compression spring 45, into the radial recess 28 on the piston rod 13, and locks the piston rod 13 relative to the booster piston 4. During the driver-actuated displacement of the piston rod 13, the transverse bore assigned, in the piston rod 13, to the control edge 18 gives rise to a hydraulic short circuit, and thus hydraulic pressure equilibrium on both sides of the arresting piston 29, such that the latter is automatically displaced into its unlocked position by the compression spring 40.

LIST OF REFERENCE SIGNS

1 Brake device
2 Booster stage
3 Booster housing

4 Booster piston
5 Pressure chamber
6 Return chamber
7 Master brake cylinder
8 Pressure piston
9 Pressure chamber
10 Motor-pump unit
11 Pressure medium reservoir
12 Return connection
13 Piston rod
14 Hydraulic passage
15 Brake pedal
16 Sensor device
17 Electronic control unit
18 First control edge
19 Reaction disk
20 Shut-off valve
21 Throttle point
22 Overflow device
23 Recess
24 Second control edge
25 Control sleeve
26 Locking means
27 Ball
28 Recess
29 Arresting piston
30 Pressure sensor
31 Transmission piece
32 Fastening bolt
33 Radial damper
34 Axial damper
35 Hydraulic connection
36 Reservoir port
37 Brake circuit port
38 Thrust piece
39 Restoring spring
40 Spring element
41 Abutment element
42 Volume flow
43 Guide disk
44 Plug element
45 Compression spring
46 Pressure duct

The invention claimed is:

1. A brake device for a hydraulic motor vehicle brake system, comprising:
a hydraulic booster stage, having a booster housing, having a booster piston which is mounted displaceably in the booster housing and which, here, separates a booster pressure chamber from a return chamber, wherein the booster pressure chamber and the return chamber are filled with a hydraulic pressure medium,
a master brake cylinder with a linearly displaceable pressure piston which generates brake pressure in a pressure chamber which is delimited by said pressure piston and which is filled with the pressure medium, wherein the booster piston acts on the pressure piston with a boosting force which results from the pressure in the booster pressure chamber,
an electrically driven motor-pump unit which feeds the pressure medium into the booster pressure chamber,
a pressure medium reservoir for the supply of the pressure medium to the motor-pump unit,
a return connection which connects the return chamber to the pressure medium reservoir,
a piston rod which is actuatable by a brake pedal and which is guided in displaceable fashion by the booster piston and which has a hydraulic passage which, in a manner dependent on an axial relative position between the piston rod and booster piston, permits a hydraulic connection between the return chamber and the booster pressure chamber,
a sensor device for a direct or indirect detection of position and/or movement of the piston rod,
a first control edge which, in the open state, permits the connection between the hydraulic passage and the booster pressure chamber and, in the closed state, shuts off said connection,
an elastic reaction disk, which is arranged between the piston rod and the pressure piston and which, when the piston rod is actuated by the brake pedal, is compressible with generation of a reaction force,
wherein a throttle point is arranged between the return chamber and the pressure medium reservoir, which throttle point gives rise to a back pressure in the return chamber above a defined displacement speed of the booster piston, and wherein the throttle point is arranged in the master brake cylinder.

2. The brake device as claimed in claim 1, wherein a shut-off valve is provided which, in an electrically actuated manner, opens or shuts off the return connection.

3. The brake device as claimed in claim 1, wherein the master brake cylinder, as a separate assembly, is detachably fastened to the booster housing.

4. The brake device as claimed in claim 1, wherein a pressure sensor is provided which detects the pressure in the booster pressure chamber and transmits this information to an electronic control unit for actuating the motor-pump unit.

5. The brake device as claimed in claim 1, wherein between the piston rod and the reaction disk, there is arranged a transmission piece which introduces the reaction force from the reaction disk into the piston rod.

6. The brake device as claimed in claim 1, wherein between the return chamber and the booster pressure chamber, there is provided an overflow device which, in the presence of a defined pressure difference between the return chamber and the booster pressure chamber, permits a volume transfer of the pressure medium from the return chamber to the booster pressure chamber.

7. The brake device as claimed in claim 6, wherein the overflow device is designed as a sealing element between the booster piston and the booster housing, which sealing element permits a volume transfer from the return chamber to the booster pressure chamber in a pressure-dependent manner.

8. The brake device as claimed in claim 6, wherein the overflow device is designed as a spring-loaded pressure relief valve.

9. The brake device as claimed in claim 8, wherein the pressure relief valve is arranged in a bore in the booster piston.

10. The brake device as claimed in claim 1, wherein the hydraulic passage is assigned a second control edge, and is positioned offset with respect to the first control edge in the direction of the master brake cylinder such that, when the first control edge is closed, a connection between the hydraulic passage and the return chamber is permitted, and when the first control edge is opened, said connection is shut off.

11. The brake device as claimed in claim 10, wherein a control sleeve is arranged radially between the piston rod and the booster piston, such that the first and second control edges act in each case between the piston rod and the control sleeve.

12. The brake device as claimed in claim 1, wherein between the booster piston and the piston rod, there is provided a locking means which, in a force-controlled manner, prevents an axial relative displacement of the booster piston relative to the piston rod.

13. The brake device as claimed in claim 12, wherein the locking means is designed to be releasable by actuation of the piston rod.

14. A brake device for a hydraulic motor vehicle brake system, comprising:
- a hydraulic booster stage, having a booster housing, having a booster piston which is mounted displaceably in the booster housing and which, here, separates a booster pressure chamber from a return chamber, wherein the booster pressure chamber and the return chamber are filled with a hydraulic pressure medium,
- a master brake cylinder with a linearly displaceable pressure piston which generates brake pressure in a pressure chamber which is delimited by said pressure piston and which is filled with the pressure medium, wherein the booster piston acts on the pressure piston with a boosting force which results from the pressure in the booster pressure chamber,
- an electrically driven motor-pump unit which feeds the pressure medium into the booster pressure chamber,
- a pressure medium reservoir for the supply of the pressure medium to the motor-pump unit,
- a return connection which connects the return chamber to the pressure medium reservoir,
- a piston rod which is actuatable by a brake pedal and which is guided in displaceable fashion by the booster piston and which has a hydraulic passage which, in a manner dependent on an axial relative position between the piston rod and booster piston, permits a hydraulic connection between the return chamber and the booster pressure chamber,
- a sensor device for a direct or indirect detection of position and/or movement of the piston rod,
- a first control edge which, in the open state, permits the connection between the hydraulic passage and the booster pressure chamber and, in the closed state, shuts off said connection,
- an elastic reaction disk, which is arranged between the piston rod and the pressure piston and which, when the piston rod is actuated by the brake pedal, is compressible with generation of a reaction force,
- wherein between the booster piston and the piston rod, there is provided a locking means which, in a force-controlled manner, prevents an axial relative displacement of the booster piston relative to the piston rod, wherein the locking means is designed to be releasable by actuation of the piston rod, and wherein the locking means is formed with a spring-loaded ball which engages into a radial recess on the piston rod.

15. A brake device for a hydraulic motor vehicle brake system, comprising:
- a hydraulic booster stage, having a booster housing, having a booster piston which is mounted displaceably in the booster housing and which, here, separates a booster pressure chamber from a return chamber, wherein the booster pressure chamber and the return chamber are filled with a hydraulic pressure medium,
- a master brake cylinder with a linearly displaceable pressure piston which generates brake pressure in a pressure chamber which is delimited by said pressure piston and which is filled with the pressure medium, wherein the booster piston acts on the pressure piston with a boosting force which results from the pressure in the booster pressure chamber,
- an electrically driven motor-pump unit which feeds the pressure medium into the booster pressure chamber,
- a pressure medium reservoir for the supply of the pressure medium to the motor-pump unit,
- a return connection which connects the return chamber to the pressure medium reservoir,
- a piston rod which is actuatable by a brake pedal and which is guided in displaceable fashion by the booster piston and which has a hydraulic passage which, in a manner dependent on an axial relative position between the piston rod and booster piston, permits a hydraulic connection between the return chamber and the booster pressure chamber,
- a sensor device for a direct or indirect detection of position and/or movement of the piston rod,
- a first control edge which, in the open state, permits the connection between the hydraulic passage and the booster pressure chamber and, in the closed state, shuts off said connection,
- an elastic reaction disk, which is arranged between the piston rod and the pressure piston and which, when the piston rod is actuated by the brake pedal, is compressible with generation of a reaction force,
- wherein between the booster piston and the piston rod, there is provided a locking means which, in a force-controlled manner, prevents an axial relative displacement of the booster piston relative to the piston rod, wherein the locking means is designed to be releasable by actuation of the piston rod, and wherein the locking means is formed with an arresting piston which is moved transversely with respect to the piston rod and which, in a manner controlled by the pressure in the booster pressure chamber, engages into a radial recess on the piston rod.

* * * * *